Jan. 2, 1968     P. P. USHER     3,361,432

MECHANICAL PACKING RING WITH A KNITTED WIRE CORE

Filed June 15, 1965

INVENTOR
Peter P. Usher
BY Sandoe, Neill, Schottler & Wikstrom
ATTORNEYS.

United States Patent Office 3,361,432
Patented Jan. 2, 1968

3,361,432
MECHANICAL PACKING RING WITH A KNITTED WIRE CORE
Peter P. Usher, Union, N.J., assignor to General Cable Corporation, New York, N.Y., a corporation of New Jersey
Filed June 15, 1965, Ser. No. 464,096
8 Claims. (Cl. 277—203)

ABSTRACT OF THE DISCLOSURE

This specification discloses a packing ring having a core made from a knitted wire mesh tube which is rolled on itself from one end to the other to form a seamless ring which has generally spiral convolutions in cross-section. The core is generally toroidal and the surface is preferably coated with a sealant over which is helically wound a tape which is preferably of asbestos or other heat resistant material. Outside of the tape wrapping, which may consist of more than one layer, there is preferably another layer of sealant and a coating of solid lubricant.

This invention relates to mechanical packing rings such as are used as shaft seals in hydraulic actuator cylinders, air cylinders, for rotating shafts and, generally, wherever sealing action must be provided in mechanical devices around rotating or sliding shafts.

One object of the invention is to provide an improved packing ring that is resilient and that is endless. No joints are used in the assembly of the ring, thereby providing size stability, good mechanical strength, and excellent liquid sealing characteristics. Many of the commercially available packings are cut from strip material or have been fabricated from strip material requiring some form of joint to complete the packing ring shape. With such constructions, leakage at the joint is possible.

Another object is to obtain resilience in a packing ring by making it with a core of knitted wire mesh material in which the wire loops of the mesh serve as individual springs, and the construction permits the spring rate to be controlled by subjecting the ring to a compression step that densifies the wire mesh core to the degree desirable for the intended end use.

Still another object is to provide a packing ring with a knitted wire mesh core for resilience and with a fibrous wrapping around the core for withstanding wear. The preferred construction has sealant over the core and over the wrapping, and has a coating or dusting of dry lubricant to reduce friction to a minimum.

Other objects, features and advantages of the invention will appear or be pointed out as the description proceeds.

Brief description of the drawings

In the drawings, forming a part hereof, in which like reference characters indicate corresponding parts in all the views.

Description of the preferred embodiments

Figure 1:
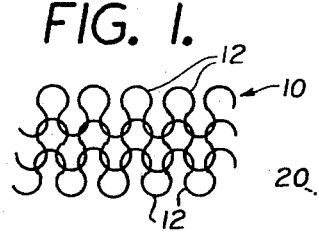
FIGURE 1 is a diagrammatic view showing a portion of the knitted wire mesh material of which the core of the packing ring is made.
Figure 2:
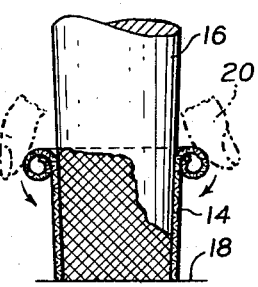
FIGURE 2 is a diagrammatic view showing the first step in the manufacture of the core by rolling a knitted wire mesh tube into a torus.

FIGURE 1 shows a section of wire mesh material 10 having loops 12 which are made of springy wire so that each loop serves as an individual spring. In the preferred construction the wire mesh material 10 is made of Inconel wire having a diameter of about 4.5 to 6 mils. The wire mesh material is knitted as a seamless tube 14, as shown in FIGURE 2.

The first step in the manufacture of the ring is to place the seamless knitted wire mesh tube 14 over a tapered mandrel 16. The tube 14 is held against sliding displacement on the mandrel 16 by an abutment 18 or by hand; and the tube is then rolled down, as indicated in FIGURE 2, and preferably by the fingers 20 of an operator; but mechanical rolling can be substituted. When the full length of the tube 14 has been rolled down on itself, the knitted mesh material forms a torus or ring.

There is some compression of the knitted wire mesh in the forming of the torus or ring 28; but the ring is further compressed and shaped by placing it in the bottom of a forming press having a cylinder 30 with a center mandrel 32 and a ram 34. The ring 28 is pressed into the clearance between the cylinder and the mandrel 32 and is then pushed down into the bottom of the clearance and compressed by the ram 34.

Figure 3:
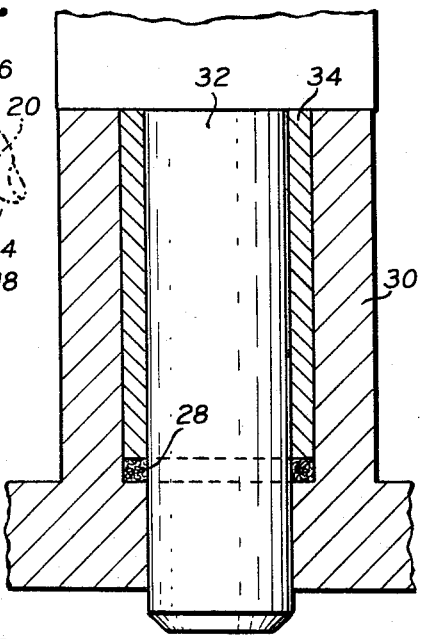
FIGURE 3 is a diagrammatic sectional view showing a shaping step in manufacturing the core of the packing ring of this invention.

The extent to which the ring 28 is compressed in the cylinder 30 of FIGURE 3 depends upon the amount of resilience which is desired in the final packing ring. It will be evident that with less compression of the ring 28, the packing ring will have more resilience. FIGURE 3 shows the ring 28 compressed to a generally square cross-section but other sections can be used depending upon the final shape of the ring and the amount of subsequent compression which is desired in the final shaping step. The compression of the ring 28 in the cylinder 30 causes the loops in the knitted wire mesh to be bent closer together and the knitted wire mesh to be "densified." By this densification, the spring constant of the knitted wire mesh structure is increased more or less asymptotically.

Figure 4:
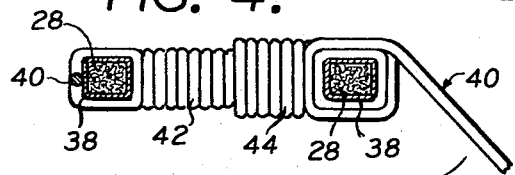
FIGURE 4 is a diagrammatic sectional view, on an enlarged scale, showing the step of wrapping the core with fibrous material.
Figure 5:
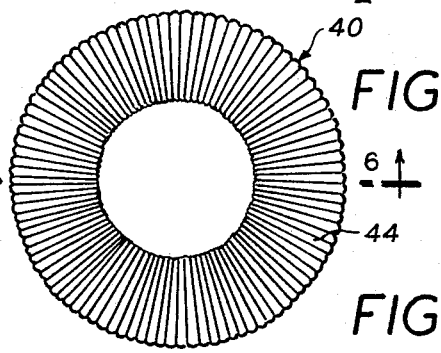
FIGURE 5 is a top plan view of the packing ring after the wrapping step shown in FIGURE 4.
Figure 6:
FIGURE 6 is a sectional view taken on the line 6—6 of FIGURE 5.

The mesh ring 28 is then coated or impregnated with a suitable sealant, usually a liquid cement having a synthetic rubber base such as butyl, neoprene, or buna. The sealant, applied to the outside of the ring 28, is shown in FIGURE 4 and designated by the reference character 38. The sealant on the mesh 28 is partially transferred to the non-metallic outer covering which is applied subsequently, and some air voids are left in the mesh structure even when the sealant is impregnated into the mesh structure instead of being merely coated on the surface.

The next step is a winding of the sealed core or ring 28 with a fibrous material 40. In the preferred construction, the ring is wrapped with a continuous yarn of the fibrous material, usually asbestos fiber or yarn of about 10 to 12 cut. Non-fibrous material, including plastic tape, can be used.

The fibrous material such as tape or yarn 40 is wrapped toroidally in a generally helical fashion around the circumference of the ring 28 with successive convolutions of the helix adjacent to one another so as to form a substantially continuous coating over the ring 28 and with each convolution in a substantially radial plane with respect to the center of the torus. One layer of the yarn 40 may be wrapped on the ring, or a plurality of layers.

FIGURE 4 shows a first underlying layer 42 and part of a second layer 44.

The yarn-wrapped ring is compressed in a restrictive cavity tool, such as shown in FIGURE 3, to further densify the entire structure and to provide a uniformly smooth outside surface. The final cross-sectional shape of the packing ring is determined by the design of this restrictive cavity tool.

After this sizing and shaping step, the ring is preferably dip coated or impregnated, usually with the same cement or sealant as used in the knitted wire mesh core, that is the sealant 38 which was applied over the knitted wire mesh core 28. This dip coating operation seals the yarn fibers at the surface and provides the proper sealing, corrosion resistance, and erosion resisting characteristics that are necessary in the completed packing ring. This dip coating can be performed before the final sizing and shaping operation if increased impregnation of the yarn of the ring is desired.

As a final operation, the outside surface of the ring is preferably dusted with a dry lubricant such as graphite, molybdenum disulfide, or tungsten disulfide or boron nitride. Such a lubricant reduces installation and operational friction. This dusting operation can be done ahead of the final pressing operation if penetration of the solid film lubricant into the coating of the ring is desired.

The final step in the manufacture of the ring is a heat curing operation to polymerize or set any sealant compound which requires polymerization or setting. Thus if the sealant 38 or the similar sealant 38' on the outside of the ring is a monomer, or partly a monomer, the heat curing operation may be desirable so as to polymerize the sealant. Some coatings will polymerize with passage of time without heat treatment but better control of the manufacture is obtained by having the final heat treating step if any polymerization or setting is necessary.

Figure 8:
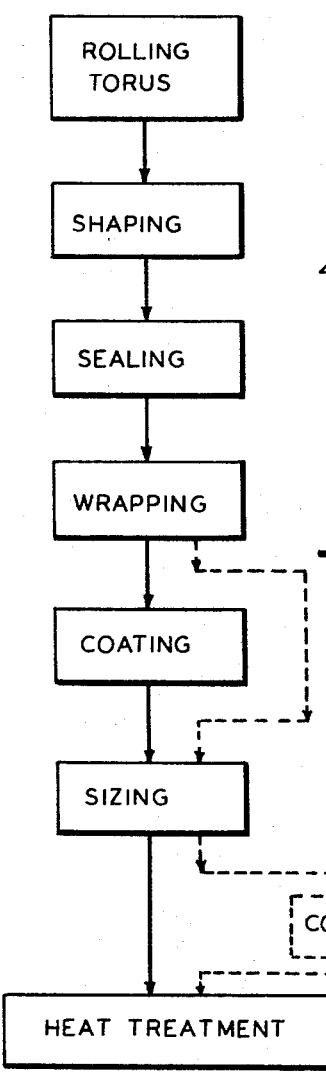
FIGURE 8 is a flow diagram illustrating the various steps in the manufacture of the packing ring of this invention.
Figure 7:
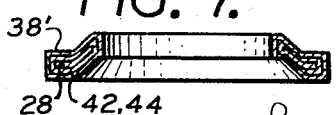
FIGURE 7 is a sectional view, on a reduced scale, showing the packing ring of FIGURE 6 after it has been compressed to its final shape.

FIGURE 7 shows the final packing ring made in accordance with the method described above; and FIGURE 8 shows the succesive steps of the process, as above described, as a flow diagram. The sealant 38 and 38' combines the convolutions of the yarn together, fills a small void and provides a smooth surface. The type of sealant used is preferably regulated to be compatible with the various hydraulic fluids which will come in contact with the packing ring in service.

The preferred embodiment of the invention has been illustrated and described, but changes and modifications can be made, and some features can be used in different combinations without departing from the invention as defined in the claims.

What is claimed is:

1. A packing ring including a seamless core of knitted wire mesh material formed with generally spiral convolutions in cross section extending about a closed and endless circumferential line for the spiral, said knitted wire mesh material being continuous around the circumferential extent of said ring and said core being generally toroidal, a helical wrapping extending around the circumference of the radial cross section of said core and over the surface of said core around the entire circumference of said ring, and an outside coating over the wrapping.

2. The packing ring described in claim 1 characterized by said core being of a cross-section generally similar to the cross-section of said ring, and a layer of sealant between said core and said wrapping.

3. The packing ring described in claim 1 characterized by the wrapping being a layer of yarn wound helically around said core.

4. The packing ring described in claim 3 characterized by said yarn being a continuous strand around said ring and made of asbestos fiber.

5. The packing ring described in claim 2 characterized by the wrapping being wound over the sealant, and another layer of sealant on the outside of the wrapping.

6. The packing ring described in claim 5 characterized by said coating being a solid lubricant over the outside of the sealant layer which is located on the outside of the wrapping.

7. The packing ring described in claim 6 characterized by the core having some air voids therein and both of said sealant layers having a synthetic rubber base.

8. The packing ring described in claim 2 characterized by said knitted wire mesh being made of Inconel wire having a diameter of about 4.5 to 6 mils and the wrapping being a layer of asbestos fiber yarn and another layer of sealant on the outside of the outer wrapping of yarn and impregnating the yarn wrapping for at least a portion of the thickness thereof, and a coating of solid lubricant on the outside of the sealant layer which is on outside of the wrapping.

References Cited

UNITED STATES PATENTS

| | | | |
|---|---|---|---|
| 536,849 | 4/1895 | Chesterton | 277—228 X |
| 2,376,039 | 5/1945 | Driscoll et al. | 277—230 X |
| 3,271,039 | 9/1966 | Kohl et al. | 277—228 |

FOREIGN PATENTS

| | | |
|---|---|---|
| 343,387 | 9/1936 | Italy. |

LAVERNE D. GEIGER, *Primary Examiner.*

J. MEDNICK, *Assistant Examiner.*